United States Patent [19]

Leneveu

[11] 4,023,996
[45] May 17, 1977

[54] MOLDABLE COMPOSITIONS COMPRISING POLYVINYL NITRATE

[75] Inventor: Louis J. Leneveu, Pont de Buis, France

[73] Assignee: Societe Nationale des Poudres et Explosifs, France

[22] Filed: Aug. 20, 1976

[21] Appl. No.: 716,271

Related U.S. Application Data

[63] Continuation of Ser. No. 491,619, July 24, 1974, abandoned.

[30] Foreign Application Priority Data

Aug. 9, 1973 France .............................. 73.29186
Dec. 4, 1973 France .............................. 73.43246

[52] U.S. Cl. .......................... 149/19.8; 149/19.9; 149/19.91; 149/100; 149/96; 102/38; 102/DIG. 1
[51] Int. Cl.² ........................................ C06B 45/10
[58] Field of Search ............. 149/19.91, 19.9, 19.8, 149/100, 96; 102/38, DIG. 1

[56] References Cited

UNITED STATES PATENTS

| | | | |
|---|---|---|---|
| 2,990,263 | 6/1961 | Avery | 149/19.8 |
| 3,006,743 | 10/1961 | Fox et al. | 149/19.91 |
| 3,078,200 | 2/1963 | Preckel | 149/96 |
| 3,639,183 | 2/1972 | Crescenzo et al. | 149/19.8 |
| 3,658,008 | 4/1972 | Larson | 102/DIG. 1 |
| 3,669,924 | 6/1972 | Daume et al. | 260/220 |
| 3,676,233 | 7/1972 | Netzer et al. | 149/19.91 |
| 3,779,820 | 12/1973 | Stevely et al. | 102/DIG. 1 |
| 3,911,825 | 10/1975 | Gawlick et al. | 102/DIG. 1 |

FOREIGN PATENTS OR APPLICATIONS 1,190,001 4/1970 United Kingdom ............ 149/19.91

OTHER PUBLICATIONS

Akiyama et al., Chem. Abs., 72, Abs. No. 3982m (1970).
Daume et al., Chem. Abs., 72, Abs. No. 134,820n (1970).

Primary Examiner—Edward A. Miller
Attorney, Agent, or Firm—Bucknam and Archer

[57] ABSTRACT

A mouldable thermoplastic composition comprises (i) polyvinyl nitrate, (ii) nitrocellulose and/or polyvinyl acetate and (iii) 2-nitro-diphenylamine and may be used to form combustible articles such as cartridge cases. Preferably, the composition comprises from 30 to 90% by weight of polyvinyl nitrate based on the total weight of components (i) and (ii). The composition may comprise up to about 30% by weight, based on the weight of components (i) and (ii), of at least one additive selected from cellulose acetate, dinitrotoluene, phthalates, non-volatile esters, heterocyclic ketones, ureas and ABS copolymers.

The combustible articles may be formed by compression moulding or injection moulding. Preferably the mouldable composition is formed into granules using the "with solvent" technique for making single base propellants, and the granules are mixed with a porous powder comprising nitrocellulose prior to being moulded to form the combustible article.

6 Claims, No Drawings

MOLDABLE COMPOSITIONS COMPRISING POLYVINYL NITRATE

This is a continuation of application Ser. No. 491,619, filed July 24, 1974, and now abandoned.

The present invention relates to mouldable compositions comprising polyvinyl nitrate. The compositions may be employed in the manufacture of combustible articles, such as cartridge cases, mortar shell ends or detonator tubes which have a very high potential and thus contribute energy for propelling a self-propelled projectile of which the combustible article forms a part.

The thermoplastic properties of polyvinyl nitrate and its value in manufacturing moulded articles have been described in French Patent No. 911,759, but the energising properties of these articles were not discussed in this patent and the patent does not contain any indication as to the nature of the mouldable composition to be used for a particular application.

The desirability of combustible articles in the fields of self-propulsion and artillery has long been apparent. In the field of self-propulsion, for example, the metal fins or certain metal parts of the stabiliser assembly add to the weight of the article for the entire duration of the flight, although they are useful only at the start of the trajectory, and require an increase in the powder charge in order to effect their propulsion. In the field of artillery, it has been found that the accumulation of empty cartridge cases in a tank poses problems, both because the empty cases clutter up the space in the tank, and because the cartridge cases also contain gases produced by the combustion of the powder, which pose toxicity problems for the occupants of the tank. These problems are far from negligible, because a lowering in the efficiency of military personnel in a tank in which a large quantity of empty cartridge cases has accumulated, has been observed.

It is known to make combustible articles, especially combustible cartridge cases, by replacing a part only of the metal casing by a combustible composition. Thus French Patent No. 1,349,818 describes cartridge cases made in two parts, namely a component made from a combustible material, namely nitrated cellulose, and a metal base. A serious problem with this arrangement is the difficulty of obtaining reliable joining of the metal and the nitrocellulose, and, of course, such cartridge cases are only partly combustible since they still contain a metal component. French Patent No. 1,573,822 describes consumable rocket fins which are destroyed during the flight of the machine, but these fins, which are made of a fusible metal, of a solid propulsion material which is not described in the patent, or of an inert plastics material, do not, on being consumed, contribute energy to propel the rocket.

An attempt has been made to manufacture combustible cartridge case bases made of a readily combustible synthetic material. Such a proposal is described in French Patent No. 1,499,078, but no mention is made in this patent of the use of a high energy thermoplastic material, such as polyvinyl nitrate.

Attempts have also been made to use materials with a high energy of combustion so that the combustion of the article would provide energy which could be used for assisting propulsion of the projectile. One technique, described in French Patent No. 2,003,848, comprises using, as the combustible material, a fibrous cellulosic base (for example, kraft), the potential of which is increased by adding crystalline explosives such as pentaerythritol tetranitrate, hexogen and octogen. However, the use of such explosives makes the preparation of the cartridge a delicate and long procedure because the entire manufacturing process is carried out in aqueous media and requires prolonged drying at the end of the manufacturing process. Another technique, described in French Patent No. 2,103,794, comprises compressing a synthetic foam made of polyvinyl acetal, polyurethane or polystyrene, but this technique is restricted to the particular materials just mentioned because it is restricted to the use of foams, and thus cannot employ a vinyl compound which is highly energising but cannot readily be made in the form of a foam, such as polyvinyl nitrate.

We have now developed certain mouldable compositions which are highly energising and which may be used to form wholly combustible articles which, during combustion of the article, generate a substantial amount of energy which can be used to assist the propulsion of a projectile with which the article is associated.

According to the invention, there is provided a mouldable thermoplastic composition which comprises (i) polyvinyl nitrate, (ii) nitrocellulose and/or polyvinyl acetate, and (iii) 2-nitro-diphenylamine.

The invention also comprises a method of making a combustible article from a composition according to the invention, which comprises forming granules of a mouldable thermoplastic composition which comprises (i) polyvinyl nitrate, (ii) at least one material selected from the group consisting of nitrocellulose and polyvinyl acetate, and (iii) 2-nitro-diphenylamine, using the "with solvent" techique for making single base propellants, and moulding the granules so formed to produce the combustible article.

The use of polyvinyl nitrate is advantageous in that, in contrast to nitrocellulose, polyvinyl nitrate softens when hot, and since the decomposition temperature is markedly higher than the temperature at which softening starts, the product is easy to work with using injection moulding techniques.

Since polyvinyl nitrate possesses poor mechanical strength, it is not used alone, but in admixture with nitrocellulose and/or polyvinyl acetate, the proportion by weight of polyvinyl nitrate preferably being from 30 to 90%. When more than 90% of polyvinyl nitrate is used, the product possesses inadequate mechanical strength for some purposes and does not sufficiently retain its shape after moulding, whilst if less than 30% of polyvinyl nitrate is used, either the difference between the decomposition temperature and the softening temperature becomes too small (when nitrocellulose is present), or the heat of combustion decreases too much (when polyvinyl acetate is present).

When nitrocellulose is used, a nitrocellulose with a low nitrogen content is preferably employed. The greater the nitrogen content of the nitrocellulose, the smaller the difference between the temperature at which softening starts and the decomposition temperature.

The mechanical properties of polyvinyl nitrate are such that it is not desirable to manufacture the combustible article from polyvinyl nitrate directly, but, rather, it is much preferred to proceed in two stages. In a first stage, small granules of the mouldable composition of the invention are manufactured, and we have found, surprisingly, that it is possible to manufacture these granules using the well-known with solvent technique for preparing single-base powders, the so-called "B powders". In a second stage, the article is then moulded, either directly from the powder granules previously prepared, or by mixing granules of porous powder comprising nitrocellulose with the powder granules previously prepared.

The granules of the mouldable composition can be manufactured in a conventional powder production line so that industries which already work with nitrated cellulosic compounds do not need to introduce new installations, and, in contrast to the majority of known techniques, the manufacture of the articles themselves is very simple and reliable and can be rendered automatic without danger since the granules of the mouldable composition can be checked before use.

In order that the invention may be better understood, a preferred method of putting the invention into practice is described below, by way of example.

As noted above, granules of the mouldable composition may be manufactured using the with solvent technique in the production of B powders. The polyvinyl nitrate is preferably dehydrated with isopropyl alcohol, and pre-ground in a hammer mill rotating at 3,000 revolutions/minute. Since the fibres of polyvinyl nitrate are very short, it is advisable to line the draining press with non-nitrated cotton linters in order to prevent loss of the fibres. The polyvinyl nitrate is then preferably placed in a Werner-type mixer together with nitrocellulose and/or polyvinyl acetate. Acetone is then preferably added in an amount of 60 cc per 100 g of dry material and 2-nitro-diphenylamine is added, as a stabiliser, preferably in an amount of 3 parts by weight per 100 parts of the mixture of polyvinyl nitrate, nitrocellulose and/or polyvinyl acetate. According to a further preferred feature of the invention, additives are added to the mixture, preferably in an amount of up to 30 parts by weight per 100 parts of the mixture of polyvinyl nitrate, nitrocellulose and/or polyvinyl acetate. These additives are preferably selected from cellulose acetate, dinitrotoluene, a phthalate, a non-volatile ester, a heterocyclic ketone (such as camphor), a urea (such as centralite) or an acrylonitrile-butadiene-styrene copolymer (ABS copolymer). The mixing preferably lasts for between 2 and 3 hours, and after mixing, the fibres are stretched at the press and are cut immediately after stretching; in this context, it should be noted that the spinning pressure must remain very low (preferably between 80 and 100bars). The granules of the mouldable composition may then be dried in air, preferably at 45° C for 100 hours. The granules thus obtained are ready to be used for moulding granules thus obtained are ready to be used for moulding.

Examples of preferred compositions of granules of the mouldable composition, together with their main physical properties are given below.

The polyvinyl nitrate used had an average molecular weight of 89, its nitrogen content was 14.7% and its potential was 990 calories/g.

1. Compositions comprising polyvinyl acetate and polyvinyl nitrate

|  | Composition 1 | Composition 2 |
|---|---|---|
| Polyvinyl acetate | 20 parts by weight | 30 parts by weight |
| Polyvinyl nitrate | 80 " | 70 " |
| 2-nitro-diphenylamine | 3 " | 3 " |
| Chemical stability* | > 70 hours | > 70 hours |
| Impact sensitivity | 0.5 kg × m | 0.5 kg × m |
| Potential | 617 calories/g | 595 calories/g |

*Vieille stability test at 108.5° C (period of time for which a sample of powder has to be heated in order to cause litmus paper to change colour).

2. Compositions comprising nitrocellulose (11.15% N) and polyvinyl nitrate

2. Compositions containing ABS (Compositons 3 to 10)

| Compositions | 3 | 4 | 5 |
|---|---|---|---|
| Polyvinyl nitrate | 80 parts | 70 parts | 70 parts |
| Nitrocellulose | 10 parts | 30 parts | 10 parts |
| 2-nitro-diphenylamine | 3 parts | 3 parts | 3.3 parts |
| ABS | 10 parts | 10 parts | 20 parts |
| Chemical stability | > 70 hours | > 70 hours | 70 hours |
| Impact sensitivity | 0.3 kg × m | 0.3 kg × m | 0.3 kg × m |
| Potential | 480 cals/g | 590 cals/g | 565 cals/g |

| 6 | 7 | 8 | 9 | 10 |
|---|---|---|---|---|
| 60 parts | 80 parts | 50 parts | 60 parts | 50 parts |
| 40 parts | 20 parts | 50 parts | 40 parts | 50 parts |
| 2.5 parts | 3 parts | 3 parts | 3 parts | 3 parts |
| 10 parts | 10 parts | 10 parts | 5 parts | 5 parts |
| > 70 hours | > 70 hours | > 70 hours | > 70 hours | > 70 hours |
| 0.3 kg × m | 0.3 kg × m | 0.3 kg × m | 0.3 kg × m | 0.3 kg × m |
| 584 cals/g | 602 cals/g | 642 cals/g | 605 cals/g | 594 cals/g |

2.2 Compositions containing dinitrotoluene (Compositions 11 to 13)

|  | 11 | 12 | 13 |
|---|---|---|---|
| Polyvinyl nitrate | 80 parts | 70 parts | 80 parts |
| Nitrocellulose | 10 parts | 30 parts | 20 parts |
| 2-nitro-diphenylamine | 3 parts | 3 parts | 3 parts |
| Dinitrotoluene | 10 parts | 10 parts | 20 parts |
| Chemical stability | > 70 hours | > 70 hours | > 70 hours |
| Impact sensitivity | 0.3 kg × m | 0.3 kg × m | 0.3 kg × m |
| Potential | 684 cals/g | 683 cals/g | 674 cals/g |

3. Composition comprising polyvinyl nitrate, nitrocellulose and polyvinyl acetate

|  | 14 |
|---|---|
| Polyvinyl nitrate | 80 parts |
| Nitrocellulose | 10 parts |
| Polyvinyl acetate | 10 parts |
| 2-nitro-diphenylamine | 3 parts |
| Chemical stability | > 70 hours |
| Impact sensitivity | 0.4 kg × m |
| Potential | 660 cals/g |

The granules of the mouldable composition thus prepared are easy to process in order to manufacture moulded combustible articles therefrom. The moulded articles can be manufactured by compression moulding or by injection moulding.

In the case of compression moulding, the desired quantity of composition is placed in the cold mould, which is heated in an oven until a temperature is reached which is 20° C above the softening temperature, that is to say approximately 120° C for the preferred compositions given above. For small articles such as cartridge cases, such a temperature is reached in about 10 minutes. The mould is then compressed under a relatively low pressure (about ten bars is sufficient for this type of composition). The mould is allowed to cool and when cold the article is released therefrom.

In the case of injection moulding, the granules are heated until a homogeneous paste-like material is obtained; this is injected by means of a press into the mould which is allowed to cool and, when cold, the article is released therefrom.

Cylindrical cartridge cases of length 1.5 cm, external diameter 1 cm and internal diameter 0.6 cm have been manufactured using the compression moulding technique. These cartridge cases possessed the following properties as a function of their composition.

lowers the potential to a greater extent than does dinitrotoluene.

According to a preferred embodiment of the invention, the combustible articles, especially combustible cartridge cases, possessing a high rate of combustion, are manufactured by mixing a porous powder comprising nitrocellulose with a mouldable composition of the invention, prior to moulding the article. Combustible articles are thus obtained which can provide a large amount of propulsion energy and which can form, for example, either combustible cartridge cases to be filled with a conventional powder, or a propellant block to be

| Composition of the cartridge case | 1 | 2 | 3 |
|---|---|---|---|
| Heat of combustion | 617 cals/g | 595 cals/g | 595 cals/g |
| Rate of combustion at 20° C under 250 bars | 22.4 mm/s. | 24.5 mm/s. | 16 mm/s. |
| Breaking load | | | |
| − 20° C | 50 kg/cm² | 50 kg/cm² | 50 kg/cm² |
| + 20° C | 10 kg/cm² | 10 kg/cm² | 20 kg/cm² |
| + 50° C | stretches | stretches | 7 kg/cm² |
| Chemical stability | > 70 hours | > 70 hours | > 70 hours |
| Unburnt materials under ordinary pressure | 6% | 8% | 4% |
| Mould-release | slight difficulties | good | good |
| Impact sensitivity | | | |
| + 20° C | 0.5 kg × m | | |
| + 40° C | 0.4 kg × m | " | " |
| + 60° C | 0.35 kg × m | | |
| + 80° C | 0.35 kg × m | | |
| Temperature at which softening starts | + 30° C | 35° C | 35° C |

| 4 | 5 | 6 | 8 | 9 |
|---|---|---|---|---|
| 642 cals/g | 646 cals/g | 626 cals/g | 650 cals/g | 638 cals/g |
| 17 mm/s. | 17 mm/s. | 13 mm/s. | 15 mm/s. | 16 mm/s. |
| 50 kg/cm² | > 50 kg/cm² | 50 kg/cm² | 60 kg/cm² | 60 kg/cm² |
| stretches | 13 kg/cm² | 25 kg/cm² | 54 kg/cm² | 50 kg/cm² |
| stretches | stretches | 8 kg/cm² | 8 kg/cm² | 6 kg/cm² |
| > 70 hours | > 70 hours | > 70 hours | > 70 hours | > 70 hours |
| 5% | 18% | 5% | 6% | 2% |
| good | good | good | good | good |
| 0.5 kg × m | 0.6 kg × m | 0.35 kg × m | 0.4 kg × m | 0.35 kg × m |
| 0.4 kg × m | 0.5 kg × m | 0.30 kg × m | 0.35 kg × m | 0.30 kg × m |
| 0.35 kg × m | 0.45 kg × m | 0.25 kg × m | 0.30 kg × m | 0.25 kg × m |
| 0.35 kg × m | 0.4 kg × m | 0.25 kg × m | 0.25 kg × m | 0.25 kg × m |
| 35° C | 40° C | 45° C | 50° C | 40° C |

| 10 | 11 | 12 | 13 | 14 |
|---|---|---|---|---|
| 670 cals/g | 734 cals/g | 712 cals/g | 764 cals/g | 660 cals/g |
| 16 mm/s. | 20 mm/s. | 17 mm/s. | 18 mm/s. | 24.5 mm/s. |
| 60 kg/cm² | > 50 kg/cm² | > 50 kg/cm² | > 50 kg/cm² | 50 kg/cm² |
| 36 kg/cm² | 15 kg/cm² | 11 kg/cm² | stretches | 10 kg/cm² |
| 15 kg/cm² | 10 kg/cm² | 7 kg/cm² | stretches | stretches |
| > 70 hours | > 70 hours | > 70 hours | > 70 hours | > 70 hours |
| 2% | 4% | 2% | 15% | 4% |
| good | good | good | good | good |
| 0.40 kg × m | 0.5 kg × m | 0.5 kg × m | 0.5 kg × m | 0.5 kg/cm² |
| 0.35 kg × m | 0.45 kg × m | 0.45 kg × m | 0.45 kg × m | 0.45 kg/cm² |
| 0.30 kg × m | 0.40 kg × m | 0.40 kg × m | 0.40 kg × m | 0.40 kg/cm² |
| 0.25 kg × m | 0.35 kg × m | 0.35 kg × m | 0.40 kg × m | 0.35 kg/cm² |
| 50° C | 35° C | 35° C | 30° C | 30° C |

From these results, it may be seen that the higher the proportion of polyvinyl nitrate, the more readily can the composition be moulded, but a slight lowering of the mechanical properties occurs at higher proportions of polyvinyl nitrate.

The choice between nitrocellulose and polyvinyl acetate depends on the desired ease of moulding and on the desired potential. Polyvinyl acetate facilitates moulding to a greater extent than does nitrocellulose, but lowers the potential to a greater extent than does nitrocellulose. Likewise, in the case of the additives, it may be seen that ABS imparts better mechanical properties to the compositions than does dinitrotoluene, but used with or without ignition powder.

A mouldable composition comprising nitrocellulose, polyvinyl nitrate and ABS is preferred for use with the latter technique, it being preferred that the proportions of the various constituents lie within the following limits:

| nitrocellulose: | 30 to 70 parts by weight |
|---|---|
| polyvinyl nitrate: | 70 to 30 parts by weight |
| ABS: | 0 to 5 parts by weight |

The nitrocellulose is preferably a nitrocellulose with a low nitrogen content (from 11 to 12.6% of nitrogen), whilst the polyvinyl nitrate is preferably highly nitrated (nitrogen content approximately 15.4%).

According to a preferred procedure for making a combustible article from a mouldable composition of the invention, a mixture consisting of a previously prepared mouldable composition and a porous powder consisting essentially of nitrocellulose is introduced into the female part of a mould. Preferably, the proportion of the porous powder comprising nitrocellulose is up to 60% by weight of the mixture. The porous powder comprising nitrocellulose advantageously contains approximately 1% of diphenylamine. The mould is then heated in an oven preferably to a temperature of about 110° C, and once temperature equilibrium has been achieved, it is left for about thirty seconds under the press and released from the mould after cooling. Combustible articles which burn in approximately half a millisecond may be obtained in this manner.

In order that the invention may be more fully understood, the following Example of the manufacture of combustible cartridge cases from a composition according to the invention is given by way of illustration only:

EXAMPLE

A porous powder comprising nitrocellulose known as BA-10 S powder and having the following composition, was employed:

| | |
|---|---|
| nitrocellulose (nitrogen content: 13.2%) | 100 parts by weight |
| diphenylamine | 1.20 " |
| potassium nitrate | 125 " |

The powder was manufactured in accordance with the with solvent process, the potassium nitrate being removed during steeping, thus rendering the powder porous. The powder was cut up into small cylinders of length 0.6 mm and diameter 0.5 mm. Its physical characteristics were as follows:

| | |
|---|---|
| density | 0.428 g/cm³ |
| alcohol | 0.044% |
| ether | 0.011% |
| diphenylamine | 1.13% |
| potassium nitrate | 0.145% |
| graphite | 0.13% |
| potential | 982 calories/g |

The following mouldable thermoplastic compositions were prepared:

| Composition: | A | B |
|---|---|---|
| nitrocellulose (nitrogen content: 12.5%) | 50 parts | 60 parts |
| polyvinyl nitrate | | |
| (nitrogen content: 15.4%) | 50 parts | 40 parts |
| ABS | 0 part | 1 part |
| 2-nitro-diphenylamine | 3 parts | 3 parts |
| solvent | 2 parts | 1.16 parts |

Completely combustible cartridge cases were produced from a mixture consisting of one of these mouldable compositions and the powder BA-10 S, the weight ratio of the mouldable composition to BA-10 S powder in the mixture being 2:1. The cartridge cases thus produced has the following physical properties:

| Cartridge cases produced with the compositions of type | | |
|---|---|---|
| | A | B |
| actual density | 1.70 g/cm³ | 1.72 g/cm³ |
| residual water | 0.8% | 0.8% |
| residual solvents | 1.6% | 1.03% |
| 2-nitro-diphenylamine | 2.6% | 2.6% |
| potential | 880 calories/g | 895 calories/g |
| start of softening | 80° C | > 80° C |
| decomposition | 200° C | 196° C |
| impact sensitivity | 0.4 kg × m | 0.4 kg × m |
| sensitivity to friction | resists 36 kg × m | resists 36 kg × m |
| chemical stability | 70 hours | 70 hours |

What is claimed is:
1. Granules of a moldable thermoplastic composition useful for the production of combustible articles which consists essentially of (i) polyvinyl nitrate, (ii) at least one material selected from the group consisting of nitrocellulose and polyvinyl acetate, and (iii) 2-nitrodiphenylamine, the amount of polyvinyl nitrate being between about 30 and about 90% by weight of polyvinyl nitrate based on the total weight of components (i) and (ii), said composition additionally including (iv) an acrylonitrile-butadiene-styrene copolymer, the amount of said acrylonitrile-butadiene-styrene copolymer being greater than zero and up to 30% based on the total weight of components (i) and (ii).

2. A composition according to claim 1, in which the amount of 2-nitro-diphenylamine is about 3% of the total weight of components (i) and (ii).

3. The granules according to claim 1 which contain 30–70 parts by weight of nitrocellulose, 70–30 parts by weight of polyvinyl nitrate and an acrylonitrile-butadiene-styrene copolymer in an amount greater than zero and up to 5 parts by weight.

4. A mixture useful for the manufacture of combustible articles consisting of the granules according to claim 1 and a porous powder consisting essentially of nitrocellulose, the amount of the porous powder being up to 60% by weight of the mixture.

5. The granules according to claim 1 wherein the combustible articles are combustible cartridge cases.

6. The mixture according to claim 4 wherein the combustible articles are combustible cartridge cases.

* * * * *